[19] United States Patent
Bartizal

[11] 3,988,278
[45] Oct. 26, 1976

[54] STABLE POLYMER LATEX AND PROCESS FOR MAKING SAME

[75] Inventor: Dennis C. Bartizal, St. Paul, Minn.

[73] Assignee: Minnesota Mining and Manufacturing Company, St. Paul, Minn.

[22] Filed: Aug. 17, 1970

[21] Appl. No.: 64,564

[52] U.S. Cl. .................. 260/29.2 TN; 260/18 TN; 260/75 NE; 260/77.5 AA
[51] Int. Cl.² ................. C08G 18/00; C08L 75/00
[58] Field of Search ............... 260/29.2 TN, 75 NE, 260/77.5 AA

[56] References Cited
UNITED STATES PATENTS

| | | | |
|---|---|---|---|
| 2,835,653 | 5/1958 | Hess | 260/72 |
| 3,012,993 | 12/1961 | Rogan | 260/77.5 MA |
| 3,264,134 | 8/1966 | Vill et al. | 260/29.2 TN |
| 3,294,713 | 12/1966 | Hudson et al. | 260/77.5 MA |
| 3,350,361 | 10/1967 | Chandley et al. | 260/77.5 MA |
| 3,410,817 | 11/1968 | McClellan et al. | 260/29.2 TN |
| 3,437,622 | 4/1969 | Dahl | 117/122 PA |
| 3,461,101 | 8/1969 | Oertel et al. | 260/77.5 AM |
| 3,479,310 | 11/1969 | Dieterich et al. | 260/29.2 TN |
| 3,491,050 | 1/1970 | Keberle et al. | 260/29.2 TN |
| 3,491,067 | 1/1970 | Sellet | 260/29.2 TN |
| 3,522,199 | 7/1970 | Keberle et al. | 260/29.2 TN |
| 3,539,483 | 11/1970 | Keberle et al. | 260/29.2 TN |
| 3,627,722 | 12/1971 | Seiter | 260/77.5 MA |
| 3,640,924 | 2/1972 | Hermann et al. | 260/29.2 TN |
| 3,663,472 | 5/1972 | Raymond | 260/29.2 TN |

Primary Examiner—Paul Lieberman
Assistant Examiner—A. H. Koeckert
Attorney, Agent, or Firm—Alexander, Sell, Steldt & DeLaHunt

[57] ABSTRACT

The disclosed self-emulsified polyurethane polyurethane-polyurea latices are formed by chain extending in water a prepolymer which contains per molecule about two isocyanate groups at the ends of a chain and attached to some of the prepolymer chains a pendant group having at its remote end a salt-forming group or a hydrophilic group which produces the self-emulsifying characteristic.

10 Claims, No Drawings

STABLE POLYMER LATEX AND PROCESS FOR MAKING SAME

This invention relates to polyurethane-polyurea, or polyurea polymers, hereinafter collectively referred to as poly[urethane]urea polymers, dispersed throughout a predominately aqueous liquid phase, which, upon evaporation of the liquid phase under ambient conditions provides solid films or coatings. An aspect of this invention relates to extremely stable aqueous poly[urethane]urea latices which are self-emulsified with hydrophilic groups in the polymer structure. A further aspect of this invention relates to poly[urethane]urea latices which are chain-extended and emulsified in the same aqueous medium.

Polyurethane latices have been made from isocyanate terminated prepolymers by emulsifying these prepolymers in water in the presence of an added emulsifying agent which will give oil-in-water emulsions, according to Mallonee U.S. Pat. No. 2,968,575, issued Jan. 17, 1961. Water, or a diprimary diamine contained therein, reacts with the terminal isocyanate groups to chain extend the prepolymers and thus give high molecular weight products having rubbery characteristics. This method suffers from the advantages from the disadvantages that it is usually quite difficult to fine a combination of prepolymer and emulsifying agent which will give stable latices of suitable small particle size. In addition the product contains a significant amount of emulsifier, and if the latex is used in forming films or coatings, the resultant articles contain the emulsifier which is at this point an unwanted diluent or plasticizer.

More recently it has been proposed in British Pat. No. 1,078,202 published Aug. 9, 1967, to form polyurethane latices free from emulsifiers by incorporating salt-type groupings into the polymer. Such incorporation is usually accomplished in solution by reacting an isocyanate terminated prepolymer with a component which will react with two isocyanate groups and which contains a salt-forming group, or by partially chain stopping the isocyanate terminated prepolymer with a monofunctional constituent which contains a salt-forming group.

The process as disclosed in this patent requires substantial completion of the polymerization in organic solvent solution followed by transfer into an aqueous phase. Usually the organic solvent must be removed by a separate distillation operation. See also U.S. Pat. Nos. 3,480,592 and 3,479,310, both issued November 1969.

Polyurethane latices have also been made using external emulsifiers from trifunctional prepolymers modified with chain stoppers such as morpholine in order to provide good film formation (See U.S. Pat. No. 3,401,133 to Grace, issued September 1968).

Accordingly, this invention contemplates a self-emulsified poly[urethane]urea latex which is: free of external emulsifiers, has high freeze-thaw and mechanical stability, has excellent shelf life, can be made without the use of any substantial amount of organic solvent, is a suitable additive for use in making beater-treated waterlaid sheets, can be thickened without the use of thickening agents, and has excellent film-forming properties. This invention also contemplates making self-emulsifiable prepolymers, chain extended in water, into polymers which contain a higher proportion of salt or hydrophilic groups than can be incorporated by presently recognized procedures using chain extension in water.

Briefly, this invention involves forming a prepolymer having an average functionality of 2.25 or more NCO groups per molecule and modifying these prepolymers with hydrophilic monofunctional reactants such that at least 25% of the prepolymer molecules are provided with hydrophilic groups on chains pendant from the prepolymer backbone. These prepolymers are then chain extended in water to create latices of self-emulsified, solid, water-insoluble poly[urethane]urea particles, the polymer molecular weight being above 10,000.

The average molecular weight of the prepolymer composition used can be from about 900 to 5000. These prepolymers, hence the resulting polymers, have been provided with at least one terminal salt-forming or other hydrophilic group per 9000 theoretical prepolymer or polymer atomic mass units (A.M.U.) and more than 25% of the prepolymer molecules are provided with such hydrophilic terminal groups. The hydrophilic group density should be higher in the case of the higher molecular weight prepolymers and/or to provide the more preferred embodiments of this invention. The hydrophilic terminal groups are derived form monofunctional reactants, preferably from protonatable tertiary amine-containing compounds having one active hydrogen-bearing group or from hydrophilic monohydric polymers of ethylene oxide, but can be derived from mono-isocyranates, e.g., an isocyanatoarylsulfonic acid.

The pendant chain on which is attached the salt-forming or hydrophilic end group (i.e. capping moiety) should contain at least 15, preferably at least 20, atoms in the chain and may contain as many as 100 atoms in the chain.

The preferred polymers and prepolymers of this invention contain at least one terminal salt-forming or other hydrophilic group for each 3000 theoretical polymer atomic weight units and at least 70% of the prepolymer molecules should contain such salt-forming or hydrophilic groups. (The preferred salt-forming groups ar radicals containing the said protonatable tertiary nitrogen.) This gives the smallest particle size, maximum latex stability and freedom from settling, and the best mechanical stability. If an attempt were made to carry out chain extension in solution using prepolymers having this much branching, invariably a gel would be formed — the chain extension must be carried out in a predominatly aqueous phase.

The particle size of these preferred latices is sufficiently small to give the latices a characteristic blue haze when viewed against a black background, and as such are suitable as paper saturants or beater additives and also have excellent film formation capabilities at room temperature, even for very high modulus, brittle polymers. Previously it has not been possible to cast continuous films from latices of those brittle polymers. The aforementioned blue haze generally indicates an average particle size range substantially below 5 microns and, particularly in the case of the nonionic latices, generally below about 1 micron. It has also been noted that the particles of those preferred latices pass through filter paper. These latices appear to have indefinite shelf life, mechanical stability, e.g. they are not coagulated by shear forces, and exhibit freeze-thaw stability. The small size of the latex particles is particularly useful in making waterlaid sheets, e.g. impregnated or beater-treated paper, because the fiber coverage is improved.

Nonionic latices are prepared by the addition of reactants such as monoalkylether or monocarboxylic acid enters of polyoxyethylene glycols or ther monofunctional organic hydrophilic material. These reactants are used to modify the above described NCO-terminated prepolymers by heating them with the prepolymer at moderate temperatures. The modified prepolymer is then dispersed in water without the aid of emulsifying agents. Nonionic latices can also be prepared by capping some of the ends of suitable polyols, as for example, a polyoxypropylene tetrol having polyoxyethylene units at the terminal ends of each arm. In this procedure, an esterifying or etherifying agent is used to cap a part of the terminal hydroxyls. These sides chains having a hydrophilic group at the end must be present in amounts sufficient to provide the prepolymer, subsequently formed by reaction of the capped polyol with diisocyanate, with hydrophilic attachments. At least 25% of the prepolymer molecules have these hydrophilic attachments.

Latices may also be made following the teachings of this invention with additional amounts of hydrophilic groups provided by difunctional reactants, such as methyl diethanolamine, or diamino sulfonic acids. Only those reactants of non-conflicting ionic types may be used together. Also combinations of cationic and nonionic or anionic and nonionic can be used. Cationic and/or nonionic hydrophilic groups provide unusually stable latices.

An advantage of the latices of this invention is that high strength, high modulus films can be made by evaporating the water under ambient conditions. Heat can be used to fuse the film, if desired. Films formed under ambient conditions, and heat treated for 5 minutes at 150° C., then cooled and tested at 25° C. exert a tensile stress of at least about 70 p.s.i. (about 5 kg/cm$^2$) and generally at least 100 p.s.i. (about 7 kg/cm$^2$) at 100% elongation, using a constant rate of extension tensile tester (e.g. an "Instron") and an extension rate of 50.8 cm/min. The stress at 100% elongation is commonly called the "100% modulus".

The preferred isocyanate terminated prepolymers used in this invention are prepared by reacting a hydroxyl-terminated material with a polyisocyanate. The hydroxyl-terminated material is usually a poly(oxyalkylene) polyol, preferably a tricol and/or a tetrol, and the polyisocyanate is usually an aromatic diisocyanate. The ratio of NCO to OH groups in the reactants is preferably between 1.5:1 and 2.5;1, although other ratios in the range of about 1.2:1 to 4:1 can be used to obtain various effects. The reaction is usually conveniently accomplished by heating the reactants at 80° to 90° C. for 3 hours and then cooling. Much longer heating or increased temperature can produce crosslinking. Highly reactive, e.g. low equivalent weight polyols can fully react with the polyisocyanate in as short a time as 1 hour, while the less reactive polyols may require 4 or even 5 hours. In any event, crosslinking introduced during the prepolymer formation step by unduly elevated temperatures or unduly extended heating should be avoided.

Polyoxyalkylene polyols and mixtures thereof used in preparing the prepolymers have a functionality or average functionality greater than 2.0 and have molecular weights generally ranging fromabout 4,500, the overall average of molecular weight being greater than 700. The polyol equivalent weights are thus preferably greater than about 150 and, in the usual practice of this invention, about 200 – 1800. Chain extension or polymerization of prepolymer molecules prior to the chain extension/emulsification step in the predominantly aqueous phase should be minimized, with the following exceptions: (1) It is permissible to provide some limited chain extension with diols, diamines, or the like, containing protonatable tertiary nitrogen, e.g. alkyl dialkanol amines, and (2) interaction between very low equivalent weight isocyanate-capped triols with glycols or triols of intermediate or higher molecular weight is also permissible. Sulfonation of prepolymers according to the teachings of U.S. patent application Ser. No. 841,570 of Robert C. Carlson, filed July 14, 1969, is also permissible, provided there will be no cationic groups on the prepolymer or resultant polymer, and provided that the anionic sites introduced by this sulfonation are in addition to, not in lieu of, the hydrophilic sites in the latex solids required by the teachings of this invention. Similarly, protonatable tertiary nitrogen introduced into the backbone portion of emulsified polymers of this invention are also to be considered merely additive to the required pendant hydrophilic site concentration. The most suitable polyoxyalkylene polyols are triols and/or tetrols or mixtures of triols and/or tetrols with glycols. A particularly suitable triol/glycol mixture involves the use of a triol of very low equivalent weight, e.g. 130 – 200, and a glycol of relatively high equivalent weight, e.g. at least 500. Examples of polyoxyalkylene triols and tetrols are the poly(oxyethylene) polyols, the poly(oxypropylene)polyols, the poly(oxypropylene/oxyethylene) polyols, the poly(oxytetramethylene)polyols, the poly(oxy-1,2-butylene)polyols, and the like. It should be borne in mind that oxyethylene units can impart so much hydrophilicity to the prepolymer that the rate of carbon dioxide gas formation during the chain extension/emulsification step in aqueous phase can be excessive and difficult to control. The presence of $C_3$ or $C_4$ oxyalkylene units in addition to oxyethylene units can greatly moderate this rate of gas formation, however. The preferred polyoxyalkylene polyols are prepared by well-known ring opening or condensation polymerization, the chain branching being introduced by reaction with $C_3 - C_{10}$ polyols such as glycerin, trimethylolpropane, trimethylolethane, pentaerythritol, 1,2,6-hexanetriol, etc. or amino compounds having 3 or more active hydrogens, e.g. ammonia, etyhylenediamine, etc., "active hydrogen" being defined by the Zerwitinoff test, *J. Amer. Chem. Soc.* 49, 3181 (1927). Other suitable polyols include castor oil, hydroxyl terminated polybutadiene, and hydroxyl terminated vinyl polymers, preferably in the 500 – 4,500 molecular weight range. Poly(oxyalkylene) polyamines, polymercaptans, or other compounds having a functionality of at least 2 active hydrogens or active hydrogen-bearing groups can also be used to prepare useful prepolymers; reference is made to the general type of materials disclosed in Table III of U.S. Pat. No. 3,400,273 (Bertozzi), issued Apr. 22, 1969, and in U.S. Pat. No. 3,179,606 (Prescott et al.), issued Apr. 20, 1965.

Polyester polyols can be used alone or in combination with polyoxyalkylene polyols in the preparation of the polymers for use in this invention. Polyester polyols can be prepared, for example, by reacting dicarboxylic acids, esters or acid halides with simple glycols or polyols. Suitable glycols are polymethylene glycols, such as ethylene, diethylene, propylene, dipropylene, tetramethylene, decamethylene glycols, substituted polymethylene glycols, such as 2,2-dimethyl-1, 3-propane diol, and cyclic glycols, such as cyclohexanediol. The aforementioned $C_3 - C_{10}$ polyols such as glycerine, pentaerythritol, trimethylol propane, etc., are used to introduce chain branching into the polyester. These hydroxy compounds are reacted with aliphatic, cycloaliphatic or aromatic dicarboxylic acids or lower alkyl esters or ester forming derivatives thereof to produce polymers bearing terminal hydroxyl groups, having melting points less than about 70° C., and characterized by molecular weights in the same approximate range as for the aforementioned polyoxyalkylene polyols; preferably the molecular weights are from about 400 to about 4500, and more preferably from about 1000 to about 2000. Examples of suitable acids are, for example, succinic, adipic, suberic, sebacic, phthalic, isophthalic, terephthalic and hexahydro terephthalic acids and the alkyl and halogen substituted derivatives of these acids.

The formation of a prepolymer can be carried out without solvents, although the presence of solvent can facilitate mixing and handling. Common solvents which are inert to isocyanates are used, e.g. toluene, xylene, acetone, etc. Such solvents are particularly useful for diluting highly reactive capping agents, e.g. the dialkyl alkanol amines, or reducing the viscosity of the prepolymer reaction mixture. Otherwise, the amount of solvents, if any, can and ordinarily should be only a minor amount (e.g. 0–25 wt. %) of the prepolymer mixture. Such minor amounts have not adverse effect on the resulting latex, but very large amounts of solvent should be distilled off after latex formation.

Various organic polyisocyanates can be used in the preparation of prepolymers for use in the invention. Because of their ready availability and the fact that they are liquid at room temperature, mixtures of the 2,4- and 2,6-tolylene diisocyanate isomers are preferred. Other preferred diisocyanates are 4,4'-diphenylene methane diisocyanate, and 3,3'-dimethyl 4,4'-diphenyl diisocyanate. Further examples of useful aromatic diisocyanates include paraphenylene diisocyanate, meta-phenylene diisocyanate, 4,4'-diphenyl diisocyanate, 1,5-naphthalene diisocyanate, 4,4'-diphenylether diisocyanate, 3,3'-dimethoxy 4,4'-diphenyl diisocyanate, and 4-chloro-1, 3-phenylene diisocyanate. Aralkylene diisocyanates such as xylylene diisocyanate are also useful.

If desired, some diamine, up to almost one amino group per isocyanate group present, can be added to the water soon after the prepolymer is emulsified to cause chain extension of the prepolymer. Such a diamine will react with the isocyanate groups more readily than does water and produce a polymer having higher tensile strength and higher modulus than is produced by simple water extension. Typical examples of diamines which can be used for phenylene diamine, tolylene diamine, ethylene diamine, propylene diamine, hydrazine, piperazine, dimethyl piperazine, methylene bis-3 -chloro-4 -aniline, polyoxyalkylene diamines or the like. If desired a small amount of triamine or polyamine can be included in the water or yield crosslinked polymers. For a latex containing anionic sites in the polymer backbone as well as anionic or nonionic (but not cationic) sites at the ends of pendant chains, the sulfonated chain extenders disclosed in U.S. patent application Ser. No. 869,337 of Robert C. Carlson, filed Oct. 24, 1969, can be present in the aqueous phase during the chain extension/emulsification step. An example of one of these sulfonated chain extenders is 1[bis(aminoethyl)amino]propane-3-sulfonic acid and salts thereof.

If this chain extension reaction is by water, there will be considerable evolution of $CO_2$ from the reaction mixture causing considerable foaming. The chain extension reaction is exothermic and thus the temperature of the reaction mixture rises slightly. The major part of the reaction will be over within an hour, but experience has shown that the chain termination reaction is generally not complete in less than about 24 hours. Chain extension by either water of a polyamine introduces polyurea links into the polymer chain, thus producing either polyurea or polyurethane-polyurea latices. Such latices are intended to be included by the term "poly[urethane]urea latices" as used herein.

The most preferred hydroxyl-terminated, branched-chain poly(oxyalkylene) or polyester prepolymer-forming starting materials (which are useful along or in combination with polyether or polyester glycols) are one of the following general types:

wherein $a$ is a number greater than 2 but not more than about 6. If $a$ represents the average of a plurality of polyol functionalities (e.g. if formula I is a mixture of compounds), $a$ must be greater than 2; if a single functionality is represented, $a$ is an integer ranging from 3 to 6.

$R^1$ or $R^2$ can be the same or different and are lower alkylene radicals forming part of an oxyalkylene chain, e.g. ethylene, propylene, tetramethylene, 1,2-butylene, etc. In a preferred embodiment, $R^2$ is propylene and $R^1$ is ethylene. It is permissible, but not preferred, to let both $R^1$ and $R^2$ be ethylene. $R^1O$ or $R^1O$ can also be divalent ester units.

$b$ and $c$ are numbers selected such that $b + c$ is at least 2, but less than about 33. If formula (I) represents a single compound, e.g. a triol, $b + c$ should be at least about 4.

$R^3$ is the residue of an active-hydrogen bearing compound bearing compound from which at least 3 active hydrogens have been removed, e.g. the residue of glycerin, trimethylol propane, trimethylol ethane, pentaerythritol, 1,2,6-hexanetriol, mannitol, sorbitol, ammonia, ethylene diamine, hydrazine, and the like. If $b + c$ is very small, e.g. 2, it is preferred that the formula (I) compound or compounds be mixed with a suitable glycol, triol, or tetrol, i.e. a compound with a formula similar to formula (I) except that $a$ is 2, 3, or 4; $b + c$ is selected such that the polyol equivalent weight is about 500 – 1800; and, in the case of a glycol, $R^3$ is the residue of a difunctional compound from which 2 active hydrogens have been removed.

The formula (I) structure is reacted with 1.2 to 4 (preferably 1.5 – 2.5) equivalents of diisocyanate (preferably one of the arylene or aralkylene diisocyanates disclosed previously) per equivalent of OH to provide an isocyanate-terminated prepolymer. This prepolymer is reacted with a sufficient amount of monofunctional capping agent to provide (1) at least 25%, preferably at least 70%, of the prepolymer molecules with a terminal hydrophilic group or capping moiety, (2) at least one terminal hydrophilic group or capping moiety per 9000 A.M.U. of prepolymer or polymer, preferably at least one per 3,000 A.M.U., and (3) pendant chains of 15–100 atoms to which the terminal hydrophilic groups are attached. The partially capped prepolymer can be partially chain extended with an alkyldialkanolamine or can be dimerized, trimerized, or the like; in any event the isocyanate equivalent weight should average at least about 400. The chain extension/emulsification in a predominantly aqueous phase has been described previously.

The hydrophilic capping moiety or terminal group preferably contains either a protonatable tertiary amine or an oxyethylene chain, both of which, if the preferred parameters of this invention are observed, apparently contribute to the formation of a small latex having the aforementioned characteristic blue haze.

The hydrophilic capping moiety can be derived from a poly(oxyethylene)mono-ol, such as a poly(oxyethylene)glycol monoester or monoether, thus providing a terminal group with the formula:

$$-O(CH_2CH_2O)_eCH_2CH_2R^4 \qquad (II)$$

wherein $R^4$ is a group which is free of active hydrogens and which does not negate the hydrophilicity of the oxyethylene units, e.g. a lower alkoxy group or an aliphatic carboxylic acid ester group of less than 24 (preferably less than 20) carbons, and $e$ is a number in the range of, for example, 5–20. An alternative method of arriving at a capping moiety of this type is to use a polyol of formula (I) wherein $R^1$ is ethylene, and $b$ is about 5 or more. $R^2$ is preferably propylene in this case, and $c:b$ can range from about 1:5 to 20:1; preferably $c:b$ is about 6:1 – 10:1 and $c+b$ is greater than 10. This polyol can be partially capped with an esterifying agent such as carboxylic acid, acid halide, or acid anhydride and then reacted with diisocyanate to provide the partially capped prepolymers of this invention.

Another very useful capping moiety is derived from di(lower alkyl)alkanol amines such as diethylethanol amine, diisopropylethanol amine, etc., which provide a capping moiety having the formula —lower alkylene—N(lower alkyl)$_2$.

A third, less preferred, type of capping moiety is derived from an isocyanatoarylsulfonic acid and therefore has the formula —CO—NH—Ar—SO$_3$H, wherein Ar is an aromatic nucleus. This capping group readily forms salts when reacted with organic or inorganic bases such as alkali metal hydroxides, tertiary amines, etc. An advantage of using the monoisocyanate-containing aryl sulfonic acids to provide hydrophilic end groups is that the diisocyanate/polyol and monoisocyanate/polyol reactions can be carried out in a single step.

It can be useful to temporarily cap some chains with a blocking group, e.g. epsilon-caprolactam to provide latex solids with the ability to liberate NCO groups upon heating. Such capping is in addition to, not in lieu of, the capping with hydrophilic terminal groups. Likewise, capping of pendant chains with other relatively non-hydrophilic capping agents (e.g. higher alkanols) or even hydrophobic capping agents is permissible if the parameters of this invention are still satisfied.

The term "aqueous latex", as used herein, denotes an "oil-in-water" type of system, wherein particulate, water-insoluble polymeric solids are the "oil" or discontinuous phase and a predominantly aqueous liquid is the "water" or continuous phase.

The term "pendant chain" denotes a chain of atoms attached to a polymer backbone.

The aqueous latices of this invention are preferably film-forming and can contain up to 70 weight percent solids, preferably less than 60%. Low solids content latices of 5 or 10 weight % are useful, but the increased drying time is inconvenient. Films formed by drying of these latices are preferably continuous and elastomeric, but nonelastomeric or brittle films are also useful. The latex solids of this invention are preferably in the small particle range discussed previously, but it is permissible to have some particles of up to 25 microns in diameter in the less preferred latices. The larger particle size latices have, of course, more of a tendency to settle, but the settled material is redispersible, even after many months of standing. The preferred small particle latices contain no visible precoagulum and do not settle, even after months of standing. Although it is permissible to add small amounts of external emulsifiers to the aqueous phase of the latex, the easy dispersibility of the self-emulsified latex solids of this invention renders the use of external emulsifiers (i.e. external to the polymer) largely or entirely superfluous. The aqueous phase to which the prepolymer is added can consist entirely of water if the hydrophilic sites in the prepolymer are nonionic or already converted to salt form if the sites are ionic. Thus, if the prepolymer contains already-protonated tertiary nitrogens in the terminal salt-forming hydrophilic groups, it is not necessary to include a proton source in the water prior to emulsification. If the prepolymer end group tertiary nitrogens are unprotonated, the aqueous phase should contain a Bronsted acid, with a $pk_a$ of less than about 5, which will not interfere with emulsification, e.g. hydrochloric acid or the water soluble $C_1 - C_4$ aliphatic carboxylic acids. Prepolymers containing —SO$_3$H groups are preferably emulsified in a neutralizing medium such as a dilute aqueous solution of an alkali metal hydroxide, a water soluble tertiary amine such as triethylamine, etc. Aprotic water miscible or -immiscible organic solvents can be present in small amounts in the aqueous phase of the latex, particularly when the prepolymer has been diluted with acetone, toluene, etc. as described previously.

The aqueous latices of this invention are useful coating, reinforcing, film forming and impregnating compositions. They are particularly useful in the art of making reinforced papers, latex paints, textile printing pastes, ink pads, filters, bearings, leather substitutes, battery separators, coated fabrics, etc. The polymeric solids of these latices generally are not significantly self-tackifying and are not ordinarily useful in adhesives unless combined with a tackifier.

Cationic or nonionic latices of this invention which have an oxyethylene content near the ends of pendant chains are particularly useful when highly viscous and/or thixotropic latices are desired, e.g. for knife coating. Aqueous polymeric latices often have a low viscosity (e.g. well below 100 cps at 25° C.) due to the substantially non-viscous continuous aqueous phase. This low viscosity can be increased with thickening agents, e.g. hydroxy ethyl cellulose. The aforementioned oxyethylene-containing latices of this invention can, however, be thickened merely by lowering the pH of the aqueous phase, e.g. with at least 0.25 parts (by weight) acetic acid per 100 parts latex. The increase in viscosity can be roughly 1–4 orders of magnitude; viscosities well in excess of 100,000 cpps have been achieved in practice. The increased viscosity is temperature and shear dependent. With these self-thickened latices, the use of external thickening agents is permissible, but unnecessary and not preferred.

The prepolymers before chain extending, or the emulsions before use, can be modified with other ingredients such as surfactants, plasticizers, dyes, pigments, minor amounts of other compatible polymers, or agents which provide light, heat, or oxidative stability, and the like.

The invention will be further illustrated with reference to the following examples in which all parts are given by weight, unless otherwise indicated.

EXAMPLE 1

494 Grams of a polyoxypropylene triol of 247 equivalent weight were dehydrated in vacuo at about 100° C. for about 30 minutes, cooled to 50° C. and then heated with 348 grams of tolylene diisocyanate (80/20 by weight mixture of 2,4-/2,6-isomers) for 1 hour at 88° C., then 3 hours additional at 75° C. The prepolymer thus formed, which had an average theoretical molecular weight of 1260, was then cooled to 65° C. and 74.2 grams diethylethanolamine (hereinafter DEEOA) diluted with 42 grams of dry toluene were added. The reaction mass exothermed to 85° C, was cooled down to 65° C. and held for 1 hour. Theoretical calculations put the frequency of occurrence of $-C_2H_4N(C_2H_5)_2$ terminal groups at 1.0 per average prepolymer molecule and one per 1380 theoretical prepolymer A.M.U.

A solution of 30 grams glacial acetic acid in 1300 grams of deionized water was prepared in a separate container equipped with a high shear mixer. The modified prepolymer was added to the water phase with agitation, forming a stable small particle size cationic latex. The theoretical calculations for frequency of protonated terminal groups give substantially the same ratio (one per 1380 A.M.U.) as that obtained for the prepolymer. After allowing 24 hours to completely cure, some of the latex was examined and found to have a distinct blue haze when viewed in a thin film against a black background, indicating small particle size.

Some of the latex was dried in a glass dish at room temperature, forming continuous, smooth film which was brittle at room temperature, but flexible at 65° C. The film had a Shore A2 Hardness of 98 and a Shore D Hardness of 58. Further properties were measured with an "Instron" tensile tester at room temperature and a constant rate of extension (50.8 cm/mm). These properties were:

| Tensile strength | 2250 p.s.i. |
| --- | --- |
|  | (157.5 kg/cm$^2$) |
| Elongation at break | 70% |

EXAMPLE 2

A prepolymer was prepared according to the method of Example 1 from:
 750 grams polyoxypropylene glycol of 1000 equivalent wt.
 236 grams polyoxypropylene triol of 141 equivalent wt.
 381 grams 2,4- and 2,6- tolylene diisocyanate (80/20 as in Ex. 1 )
 65.8 grams diethylethanolamine (DEEOA) diluted with 117 grams of toluene.

The resulting prepolymer, before the addition of DEEOA, had an average theoretical molecular weight of 2280 A.M.U.; after DEEOA the terminal group frequency was 0.94 per average prepolymer molecule and one per theoretical 2560 A.M.U. (As in Example 1, this 1/2560 ratio also applies to polymer A.M.U.)

A latex was prepared from this modified prepolymer according to the method of Example 1 in 2100 grams deionized water containing 34 grams glacial acetic acid.

After curing, the latex was found to be of small particle size, as evidenced by the bluish haze against the black background. When some of the latex was dried in a dish a continuous film of snappy, stiff polymer was deposited which had a Shore A$_2$ Hardness of 65. Other properties (same conditions as Example 1) were:

| Tensile strength | 1080 p.s.i. |
| --- | --- |
|  | (75.6 kg/cm$^2$) |
| 100% modulus | 350 p.s.i. |
|  | (24.5 kg/cm$^2$) |
| Elongation at break | 520% |

EXAMPLE 3

A prepolymer was prepared according to the method of Example 1 from:
 983 grams polyoxypropylene glycol of 983 equivalent wt.
 210 grams polyoxypropylene triol of 141 equivalent wt.
 435 grams 2.4-, 2,6-tolylene diisocyanate (80/20 as in Ex. 1)
 58.6 grams diethylethanolamine (DEEOA) diluted with 58.6 grams of toluene.

Before the addition of DEEOA, the resulting prepolymer had an average theoretical molecular weight of 1630 A.M.U.; after DEEOA the terminal group frequency was 0.5 per average prepolymer molecule and one per 3380 theoretical A.M.U. of prepolymer (or polymer, after latex formation).

A latex was prepared from the modified prepolymer according to the method of Example 1 in 2500 grams deionized water containing 30 grams glacial acetic acid.

When some of the latex was dried in a dish a continuous film of a snappy polymer was deposited. Other properties (same conditions as Example 1) were:

| Tensile strength | 1680 p.s.i. |
| --- | --- |
|  | (117.6 kg/cm$^2$) |
| 100% modulus | 440 p.s.i. |
| Elongation at break | 580% |

EXAMPLE 4

898 Grams of a polyoxypropylene triol of 896 equivalent weight were dehydrated in vacuo at about 100° C. for 30 minutes. After cooling to room temperature, 174 grams of 2,4-, 2,6-tolylene diisocyanate (80/20 as in Ex. 1 ) were added, and the mixture was heated to 88° C. and held at that temperature for four hours with stirring. Then a mixture of 13.55 grams 1-butanol and 160 grams of an ethylene oxide adduct of oleic acid (polyoxyethylene portion ~ 600 molecular weight) was added to the prepolymer and allowed to react at 88° C. for 1 hour. The average theoretical molecular weight of prepolymer, excluding the polyoxyethylene glycol monooleate capping agent addition was 3300. With these monooleate terminal groups, the terminal group frequency was 0.55 per average molecular weight and one per 6800 theoretical A.M.U. of prepolymer (or polymer).

555 Grams of deionized water were placed in a separate container equipped with a high shear mixer, and 311 grams of the above prepolymer were added to the water with agitation. A stable nonionic latex was formed. After allowing 24 hours to completely cure, some of the latex was poured into a dish and allowed to dry, forming a continuous polymer film which was then heated 12 hours at 65° C. and then tested on the Instron. The following physical properties were calculated from a 20 inches per minute (50.8 cm/min) rate of extension:

| Tensile strength | 108 p.s.i. |
| | (7.56 kg/cm²) |
| Elongation at break | 160% |
| 100% modulus | 89 p.s.i. |
| | (6.23 kg/cm²) |

EXAMPLE 5

47.7 Grams of phenyl isocyanate were dissolved in 400 ml. tetrachloroethylene and 32.0 grams stabilized sulfur trioxide were slowly added to the mixture while cooling was applied to keep the temperature at 35° to 40° C. The temperature was then raised to 50° C. and held 1 hour. The insoluble product was removed from the tetrachloroethylene by filtration and washed with dry toluene.

The entire yield of 79.6 grams of the above sulfonated phenyl isocyanate were added in a slurry containing 50.4 grams of toluene to 229 grams of polypropylene triol of 245 equivalent weight and the mixture was heated at 95° C. for 1 hour, then cooled to 80° C., and 139.2 grams of 2,4-, 2,6-tolylene diisocyanate (80/20 as in Ex. 1) were added. Cooling was applied and the batch exothermed to 110° C., was cooled to 80° c., and held 1 hour. After finally cooling the prepolymer to 50° C., 40.0 grams of triethylamine were added and after stirring for 5 minutes, the prepolymer was added to 800 grams of deionized water with high shear agitation. A stable anionic latex was formed. The prepolymer, excluding isocyanatophenylsulfonic acid termination had a theoretical average molecular weight of 1080; with these terminal groups included, there were 1.0 terminal groups per average prepolymer molecule and one terminal group per 1340 theoretical polymer or prepolymer A.M.U.

What is claimed is:

1. A latex comprising:
   I. a predominantly aqueous continuous phase, and
   II. 5 to 70% by weight of said latex of particles up to 25 microns in diameter of poly(urethane)urea polymer dispersed in said aqueous phase, said polymer when formed into a film and elongated at 50.8 cm/min at room temperature exerting a tensile stress of greater than 70 p.s.i. at an elongation of 100%, or at break when less than 100% longation, said latex resulting from substantially simultaneous emulsification and chain extension in said aqueous phase of an isocyanate-terminated prepolymer in which at least 25 percent of the molecules contain hydrophilic capping moieties on chains pendant from the prepolymer backbone, said pendant chains containing 15 – 100 atoms in the chain, and said prepolymer containing at least one said capping moiety for each 9000 theoretical prepolymer atomic mass units.

2. A latex according to claim 1 wherein said prepolymer contains at least one hydrophilic capping moiety for each 3000 theoretical polymer atomic mass units.

3. A latex according to claim 2 wherein at least 70% of the prepolymer molecules contain hydrophilic capping moieties.

4. A latex according to claim 2 wherein said poly(urethane)urea polymer particles are smaller than 1 micron in average size.

5. A latex according to claim 1 wherein said hydrophilic capping moieties are cationic.

6. A latex according to claim 5 wherein said hydrophilic capping moieties are —(lower alkylene —)NH(-lower alkyl)$_2^+$.

7. A latex according to claim 1 wherein said hydrophilic capping moieties contain a sulfonate anion.

8. A latex according to claim 1 wherein said hydrophilic capping moieties contain oxyethylene units.

9. A latex according to claim 1 wherein the average isocyanate equivalent weight of said isocyanate-terminated prepolymer composition is at least 400, said prepolymer being derived from a reaction mixture comprising at least one polymeric polyol of the formula:

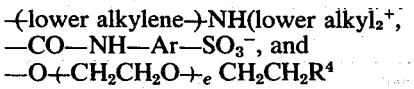

wherein R³ is the residue of a C$_3$ – C$_{10}$ polyol from which at least 3 active hydrogens have been removed, R¹ and R² are alkylene radicals, c and b are numbers selected such that c + b is at least 2 but no more than about 33, and a is an integer greater than 2 but not more than 6.

10. A latex according to claim 9 wherein said hydrophilic capping moieties are selected from:

—(lower alkylene—)NH(lower alkyl$_2^+$,
—CO—NH—Ar—SO$_3^-$, and
—O—(CH$_2$CH$_2$O—)$_e$ CH$_2$CH$_2$R⁴ wherein
Ar is an aromatic nucleus,
e is a number from about 5 to about 20, and
R⁴ is a group free of active hydrogens which does not negate the hydrophilicity of the oxyethylene units in the capping moiety.

* * * * *